No. 808,769. PATENTED JAN. 2, 1906.
G. W. MARBLE.
POWER TRANSMITTING DEVICE.
APPLICATION FILED DEC. 15, 1904.
4 SHEETS—SHEET 2.
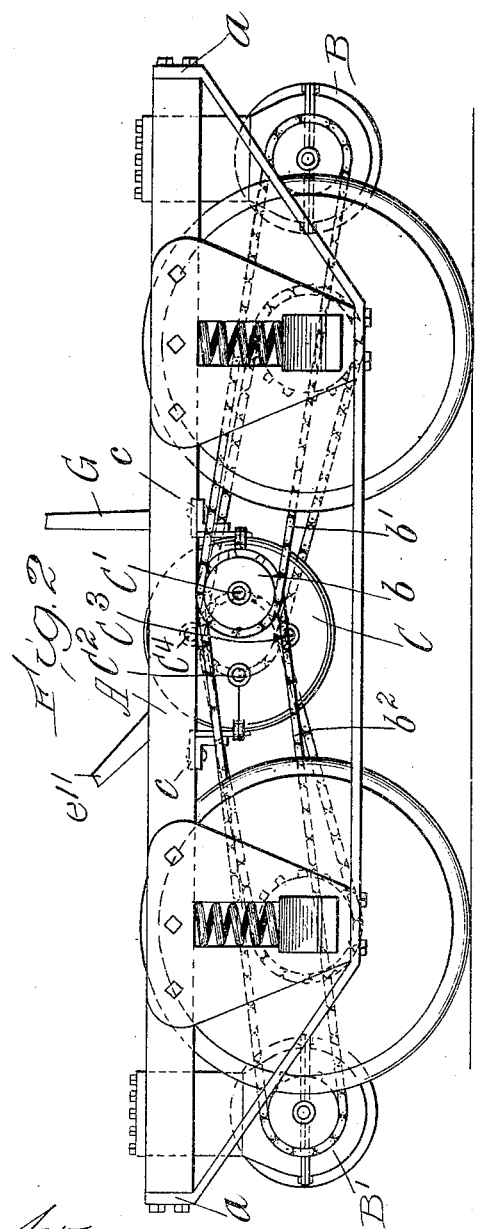
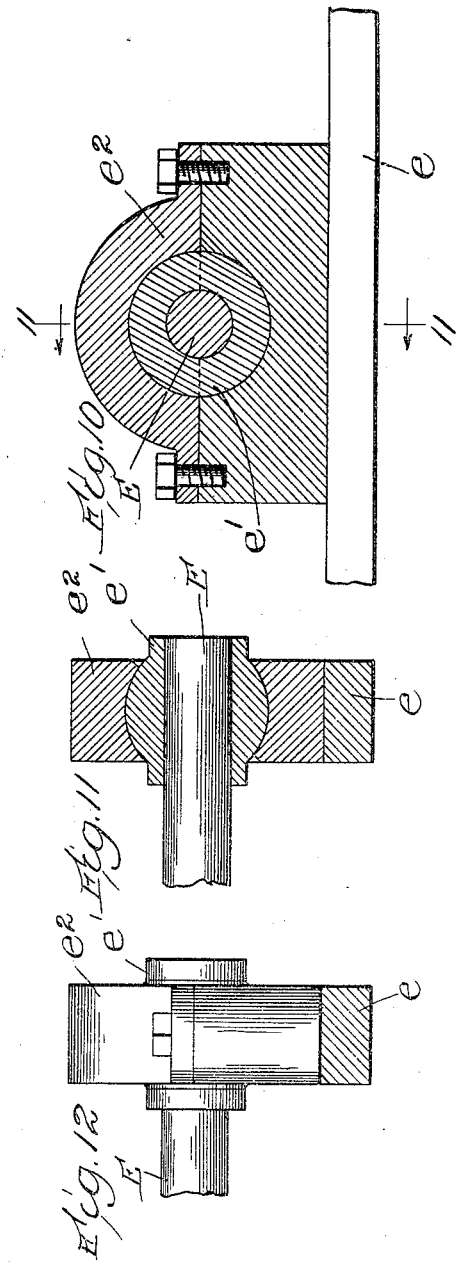

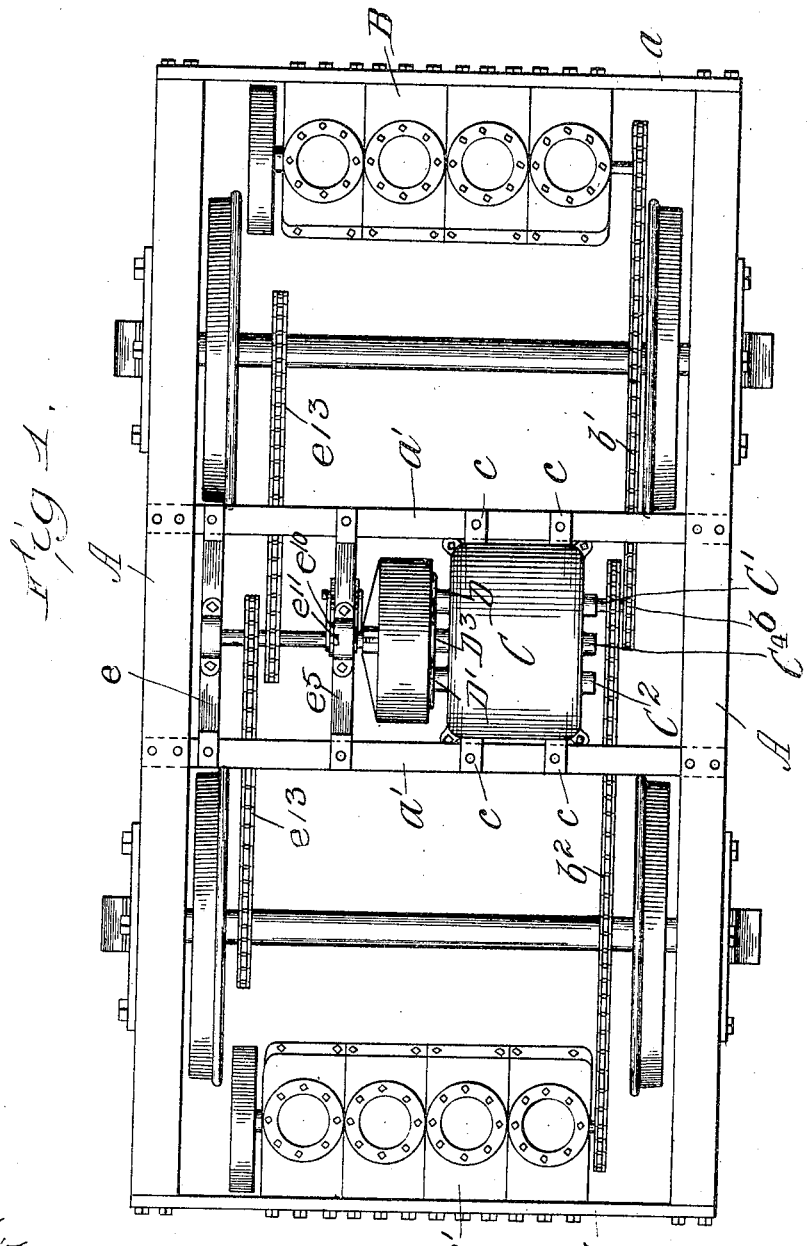

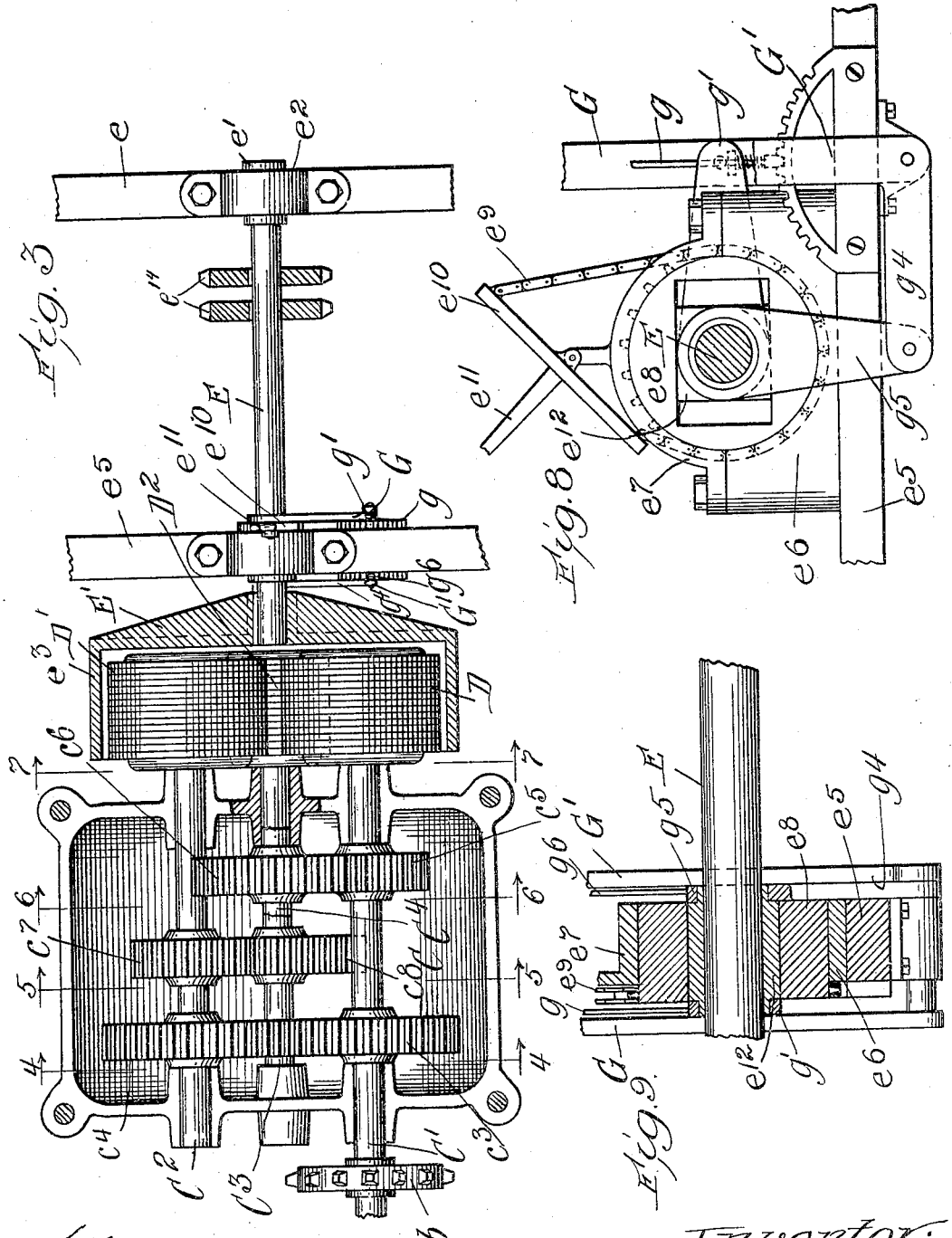

No. 808,769. PATENTED JAN. 2, 1906.
G. W. MARBLE.
POWER TRANSMITTING DEVICE.
APPLICATION FILED DEC. 15, 1904.
4 SHEETS—SHEET 4.
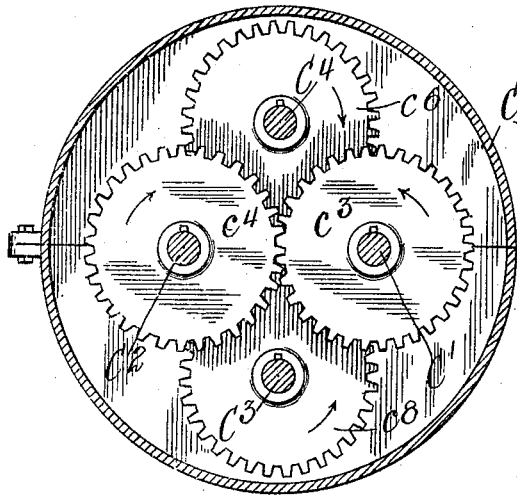
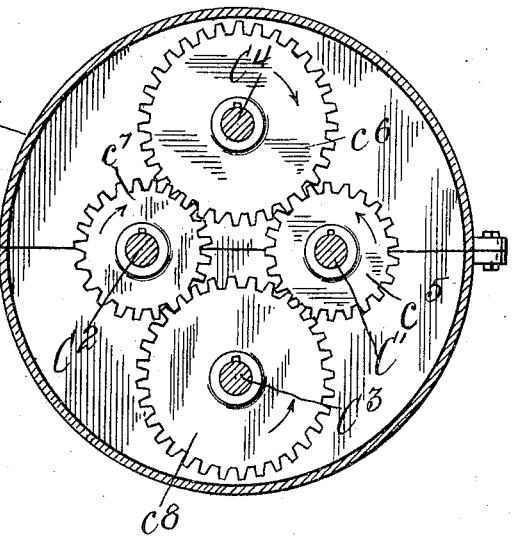
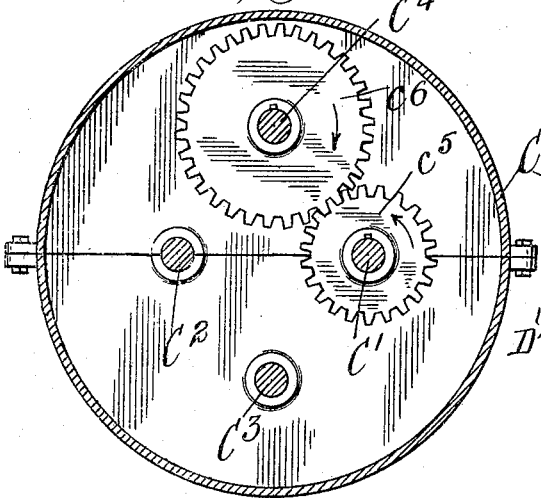
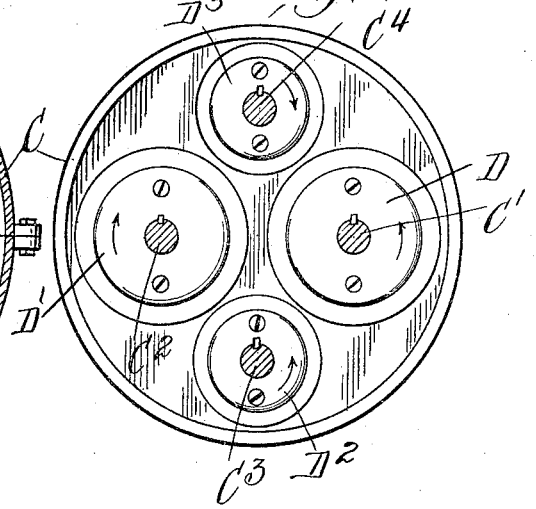
Witnesses:
Inventor:
George W. Marble,

UNITED STATES PATENT OFFICE.

GEORGE W. MARBLE, OF CHICAGO, ILLINOIS.

POWER-TRANSMISSION DEVICE.

No. 808,769.  Specification of Letters Patent.  Patented Jan. 2, 1906.

Application filed December 15, 1904. Serial No. 237,011.

*To all whom it may concern:*

Be it known that I, GEORGE W. MARBLE, a citizen of the United States, and a resident of the city of Chicago, in the county of Cook and State of Illinois, have invented certain new and useful Improvements in Power-Transmission Devices; and I do hereby declare that the following is a full, clear, and exact description of the same, reference being had to the accompanying drawings, and to the letters of reference marked thereon, which form a part of this specification.

This invention relates to power-transmission devices, and more particularly to a reversible power-transmission device operating by friction. Heretofore many transmission devices having toothed gears, some of which are of a planetary form and others adapted to permit one gear to slide into engagement with another, have been constructed. With these devices much difficulty has been experienced, owing to the wear and stripping of the gears. Many of the frictional transmission devices heretofore constructed have either been adapted for but a single speed of drive or have been constructed to vary the drive by shifting the driven element radially of the driving element. In such frictional transmission constructions the slipping of one of said frictional elements with respect to the other causes considerable wear and tends to shorten the life and destroy the efficiency of the device when in use.

The object of this invention is to provide a reversible speed and power transmission mechanism adapted to be used in connection with a constant speed or any suitable motor and in which the driving elements or friction members may be operated continuously, if preferred, and in which two speeds of drive in either direction are afforded for the driven element.

It is also a further object of the invention to afford a construction in which the driven element is adapted to be moved into and positively held in engagement with the driving friction element and also one in which the friction-faces are inclosed to prevent access of dust or moisture.

It is also an object of the invention to afford a strong, simple, and durable construction adapted to transmit power and speed practically without slippage and so constructed as to enable the device to be operated by a single lever, if preferred, either to drive, to brake, or to reverse.

The invention is shown embodied in a car or car-truck for convenience, though obviously the same may be adapted for many other purposes than the propulsion of vehicles.

The invention embraces many novel features and consists in the matters hereinafter described, and more fully pointed out and described in the appended claims.

In the drawings, Figure 1 is a top plan view of a device embodying my invention, showing the same embodied in connection with a car. Fig. 2 is a side elevation of the same. Fig. 3 is an enlarged horizontal section of a device embodying my invention. Fig. 4 is a section taken on line 4 4 of Fig. 3. Fig. 5 is a section taken on line 5 5 of Fig. 3. Fig. 6 is a section taken on line 6 6 of Fig. 3. Fig. 7 is a section taken on line 7 7 of Fig. 3. Fig. 8 is an enlarged fragmentary detail illustrating the shifting mechanism. Fig. 9 is a central vertical section of the same taken longitudinally of the shaft. Fig. 10 is an enlarged transverse section of the bearing for the outer end of the driven or transmission shaft. Fig. 11 is a section taken on line 11 11 of Fig. 10. Fig. 12 is a side elevation of the same.

As shown in said drawings, A indicates the side sills of a truck or a car, such as an inspection-car. *a* indicates the end sills thereof.

*a'* indicates two transverse carrying members or sills positioned on opposite sides of the center of the truck and rigidly secured to the side sills. Said carrying members or sills *a'*, should the device be used as a car-truck, are positioned on opposite sides of the truck-bolster, the ends of which rest upon and are secured to the side sills, but which in the present instance is not shown.

Rigidly supported on one or both ends of the truck on the end sills *a* are the motors B and B', herein shown as internal-combustion engines of any preferred construction, though obviously other preferred motors may be used.

Supported upon the central transverse carrying-sills *a'* is a gear-case C, constructed of cast metal or other suitable material and, as shown, provided with laterally-directed lugs or straps *c*, which may be integral therewith, if preferred, and which rest upon and are bolted or otherwise rigidly secured upon said transverse members *a'*. Journaled in said gear-case transversely of the car-frame are the rotative shafts C', $C^2$, $C^3$, and $C^4$, of which the shafts C' and C² are disposed in opposite sides of the gear-case at approximately the same level and the shafts C³ and C⁴ are journaled equidistant from each and above and below the same and at greater distance between centers. The ends of all said shafts extend through the inner end of the gear-case to approximately a central position in the truck and are each provided with a driving friction-wheel D, D', D², and D³, respectively, which are rigidly engaged one upon the extremity of each of said shafts and of which friction-wheels upon the shafts C' and C² afford a pair of equal size and those upon the shafts C³ and C⁴ are of equal size, but smaller than the friction-wheels D and D'. The end of the shaft C' projects through the outer end of the gear-case, as shown in Fig. 1, and secured thereon are sprocket-wheels $b$, which are connected with the motors B and B' at the ends of the car by means of the sprocket-chains $b'$ and $b^2$, whereby said shaft is driven by said motors. Rigidly secured on the shafts C' and C², which drive the friction-wheels D and D', are intermeshing gears $c^3$ and $c^4$ of equal size, causing said shafts to rotate oppositely and at equal speed. On the shaft C' is secured a pinion $c^5$, which intermeshes with a larger gear $c^6$ on the shaft C⁴, causing said shaft C⁴ to rotate oppositely from and much slower than the rotation of the shaft C'. The smaller friction-wheel D³, carried on the shaft C⁴, is thus driven at a slower rate than the larger friction-wheel D', carried on the shaft C², which revolves in the same direction. A pinion $c^7$ of the same size as the pinion $c^5$ is secured on the shaft C² within said gear-case and intermeshes with a gear $c^8$ on the shaft C³ equal in size with the gear $c^6$ on the shaft C⁴, thus rotating the shaft C³ in the same direction with the shaft C'. The friction-wheel D² on the shaft C³ is of the same size as the friction-wheel D³ and rotates at the same peripheral speed, but oppositely. Journaled in alinement with the axis of said gear-case is a transmission-shaft E, which is journaled at its outer end, as shown, upon a longitudinal beam $e$, secured at its ends upon the central transverse sills $a'$ and in close relation to the side sill A. As shown, upon the end of said shaft is secured a bearing-sleeve $e'$, shaped on its outer surface to afford one member of a ball-and-socket bearing, as shown in Figs. 10 to 12, inclusive, and fits in a bearing-box $e^2$, complemental therewith, thus affording considerable amplitude of movement at the other end of said shaft or that adjacent the driving friction-wheels. Rigidly secured upon the inner end of said shaft E in close relation to the driving friction-wheels and inclosing the same is a friction drum or shell E', which, as shown, comprises a hub portion and a peripheral flange $e^3$, within which said driving friction-wheels project and which afford an internal friction-surface adapted to engage the periphery of any of said driving friction-wheels when adjusted thereto. Means are provided for adjusting said friction drum or shell into frictional engagement with the friction-wheel D² and then D for the drive in one direction or D³ and then D' for the drive in the other direction. Closely adjacent the hub of the friction-shell E' is an adjustable bearing for said shaft which, as shown, is supported upon a short longitudinal beam or sill $e^5$, supported at its ends on the transverse sills $a'$. Said bearing comprises a bearing-box $e^6$ and cap $e^7$ therefor rigidly secured thereto by means of stud-bolts or other suitable means and in which revolves a cylindric sleeve $e^8$, which at one end projects beyond the box and is provided with sprocket-teeth adapted to be engaged by a sprocket-chain $e^9$, which passes around the same and the ends of which are secured to the opposite extremities of a centrally-pivoted bar $e^{10}$, carried upon the cap $e^7$. Said bar is provided with a central lever-handle $e^{11}$ at right angles therewith, as shown in Fig. 8, and whereby said bearing-sleeve $e^8$ can be partly rotated within the journal-box. Said sleeve is provided with a relatively broad diametrical slot therein, as shown in Fig. 8, in which is slidably secured bearing-blocks $e^{12}$, in which the shaft E is journaled. As shown, means are provided for sliding the bearing-block with said shaft in said slot to bring any one of the friction-wheels D, D, D², or D³ into driving engagement with the periphery $e^4$ of the transmission friction-drum comprising a lever G, pivoted on said sill or beam $e^5$ and extending upwardly through the floor of the truck or car and provided with a detent and notched segment $g$ therefor, as shown in Figs. 3 and 8. Said lever is connected, by means of a connecting-rod $g'$, with the bearing-block $e^{12}$ for said shaft and acts when the bearing-sleeve $e^8$ is properly adjusted to adjust the end of said shaft and to hold the same rigidly adjusted by means of said segment. Means are also provided fo slightly elevating or depressing the end of said shaft to adjust the same to the desired driving friction-wheel, comprising a bell-crank lever pivoted on said beam or sill $e^5$, comprising an upwardly-directed end G', affording an operating handle or lever, and a right-angled arm $g^4$, which extends below said bearing and is pivotally connected with an arm $g^5$, also connected on the bearing-block $e^{12}$ for said shaft. Said shaft can be quickly adjusted vertically by adjusting the sleeve $e^8$ and shifting said lever, and a toothed segment and detent $g^6$, as shown, holds the shaft in adjusted position. Sprocket-wheels $e^{14}$ are rigidly secured on said shaft E and sprocket-chains E¹³ lead therefrom to corresponding sprocket-wheels secured upon the vehicle-axles, whereby the power of the motors is delivered to drive the car or vehicle.

The operation is as follows: Should the transmission mechanism be used in connection with a vehicle, and it is described with reference to a railway-truck or inspection-car, one or more motors may be provided upon the truck, which may be located at the ends of the truck or in any preferred location and the transmission mechanism may be secured, as shown, centrally of the vehicle or elsewhere, as convenience dictates. The drive being direct to the shaft C', the gearing in the gear-case intermeshes to cause two of the adjacent shafts to revolve in the same direction, and the remaining two, closely adjacent to each other, to revolve in the opposite direction. These shafts, as shown, each carry a driving friction-wheel, of which the friction-wheels D and $D^2$ revolve in one direction, while the oppositely-disposed friction-wheels D' and $D^3$ revolve in the other. The friction-wheels $D^2$ and $D^3$, as before described, revolve at a very slow rate as compared with the rate of the larger friction-wheels D D'. The bell or drum E' of the transmission mechanism fits loosely over said driving friction-wheels and normally is out of contact with all of the same. When, however, it is desired to propel the vehicle in either direction or to transmit power to the mechanism to be driven, be it a vehicle or other mechanism, the shell or drum is shifted in one or the other direction to bring its peripheral surface first into frictional engagement with the slow-speed driving friction-wheels $D^2$ or $D^3$, dependent on the direction of movement desired. After the load is started the transmission friction-drum is shifted into engagement with the appropriate high-speed driving friction-wheels D or D'. This is accomplished by adjusting lever $e^{11}$ to bring the slot in the sleeve $e^8$ into radial alinement with the friction-wheel to be engaged and then shifting the transmission friction-drum by means of one or both levers G and G', bringing the friction face thereof into positive engagement with the appropriate driving friction-wheel. The detents for said levers serve to rigidly lock the bearing-sleeve for said shaft in the desired adjusted position, and thus hold the parts in driving relation until released by the proper manipulation of said levers. It is evident that either friction-wheel of one pair acts powerfully as a brake against movement of the transmission-shaft occasioned by either of the others.

Obviously, if preferred, where slow speed is not required the friction-wheels may all have the same peripheral speed in this construction, and the adjusting-sleeve $e^8$ may be permanently secured with the slot at the appropriate angle to enable the driven friction member to be moved simultaneously into engagement with both friction-wheels of either pair of driving friction-wheels, and as it is obvious that the relative position of the driving friction-wheels remains unchanged at all times the entire adjustment of the driven friction member may be accomplished by the use of a single lever, if preferred. In such an installation, inasmuch as two of the driving friction-wheels engage the driven member simultaneously, a relatively large frictional surface is at all times afforded, thus securing the desired drive with small slippage. The reverse may of course always be utilized as a powerful brake, if desired.

Obviously, owing to the construction described, all parts of the mechanism are at all times readily accessible, and as it is only necessary to remove the caps of the boxes for the shaft E to permit said shaft and the driven friction member to be lifted away, exposing the driving friction-wheels.

It is an important feature of my invention, especially where used for purposes of propelling vehicles or wherever exposed to atmospheric changes, that the driving mechanism is at all times protected from moisture finding its way therein, and in consequence the transmission mechanism cannot vary in efficiency.

While I have described my invention with reference to its use in transmitting the power of a motor to propel a vehicle, it is obvious the invention may be used for any and all purposes where the power of a motor of any desired kind is to be transmitted to propel or drive mechanism of any kind. I therefore do not desire to be limited in this application for patent otherwise than necessitated by the prior art, as obviously many details of construction may be varied without departing from the principles of this invention.

I claim as my invention—

1. The combination with a motor-shaft, of a plurality of pairs of shafts driven therefrom, the shafts of each pair being driven oppositely, a plurality of driving friction members on said shafts, a driven friction member adapted to be engaged by either of the driving friction members of one pair of shafts in driving and of another pair in reversing, a driven shaft, and an operative connection between the same and the driven friction member.

2. In a machine of the class described, the combination with a driving-shaft and an oppositely rotative shaft driven thereby, of a friction-wheel on each of said shafts, a driven friction member inclosing the same and adapted to be engaged and driven by either and mechanism for adjusting the driven friction member into engagement with either of said wheels.

3. In a transmission device the combination with parallel shafts of intermeshing gears thereon, a motor-shaft, positive connection between one of said shafts and said motor-shaft, a driving friction-wheel on each of said parallel shafts, a driven friction member comprising a shell or drum extending over the driving friction-wheels and mechanism adapted to shift the same into engagement with any of the driving friction-wheels.

4. In a transmission device the combination with a plurality of parallel shafts one of which is motor-driven, of intermeshing gears on said shafts rotating the same oppositely, a driving friction-wheel on each shaft, a driven friction member adapted to engage the same, means adjusting the driven friction member into engagement with any driving friction-wheel and operative connection between the driven friction member and the mechanism to be operated.

5. In a transmission device the combination with a motor-shaft and a plurality of shafts geared to rotate oppositely in pairs, of a driving friction-wheel on each of said last-named shafts, one of each pair operating at high speed and the other at low speed, a transmission-shaft, a friction drum or shell rigidly secured thereon and partly inclosing the driving friction-wheels, operative connections between the transmission-shaft and the mechanism to be operated and means adapted to adjust the shell or drum into engagement with any driving friction-wheel.

6. In a device of the class described the combination with parallel shafts of operative connections between the same whereby two of said shafts rotate oppositely from one another at a high and at a low speed respectively, driving friction-wheels on the extremity of each shaft, that on the low-speed shaft being smaller than that on the high, a transmission-shaft, a driven friction member secured thereon and partly inclosing the driving friction-wheels and mechanism adapted to bring any of the driving friction-wheels into operative engagement with the driven friction member and one or more chain-and-sprocket connections between the transmission-shaft and the mechanism to be operated.

7. A transmission device comprising a motor-shaft, parallel shafts driven therefrom, intermeshing gears acting to drive two of said shafts in one direction and two in the opposite direction and one of each pair at high speed and the other of each pair at a relatively low speed, a driving friction-wheel on each of said shafts, those on the low-speed shafts being the smaller, a transmission-shaft, a driven friction member thereon which partly incloses the driving friction-wheels, adjusting means adapted to shift the driven friction member into engagement with any of the driving friction-wheels whereby the transmission-shaft is driven in either direction and at high or low speed.

8. In a machine of the class described parallel rotatable shafts, a motor-shaft acting to drive one of said shafts, operative connections between the shafts adapted to drive two in one direction and two in the opposite direction, one of the shafts of each pair rotating at slow speed, a small driving friction-wheel on each of the latter shafts, a larger driving friction-wheel on each of the other shafts, a transmission-shaft, a friction shell or drum thereon adapted to extend over and partly inclose the driving friction-wheels, and an adjustable bearing for the transmission-shaft adjacent the friction-shell whereby said shaft is afforded an orbital movement in adjusting the friction-shell to the selected driving friction-wheel and one or more locking-levers adapted to hold said shaft in its adjusted position.

9. In a frictional transmission, the combination with a transmission friction-shell, of a plurality of driving friction-wheels arranged to engage the same, said driving friction-wheels comprising independent low and high speed driving and reverse friction-wheels and mechanism adapted to engage any of said friction-wheels with the friction-shell.

10. In a machine of the class described, high and low speed driving friction-wheels and high and low speed reversing friction-wheels, a driven friction-shell adapted for adjustment into engagement with any selected friction-wheel and adjusting mechanism acting positively to engage the parts in driving relation.

11. The combination with a hollow driven element of continuously-rotating high and low speed driving elements and high and low speed reversing elements engaging within said driven element and adjusting means adapted to engage the driven element with any selected driving element independently.

12. The combination with high and low speed driving friction-wheels and corresponding reversing friction-wheels of a drum adapted to engage any of the same, a shaft driven thereby, a bearing adjacent the drum and means affording an orbital adjustment of said shaft independent of its rotation adapted to adjust said drum into engagement with any selected driving or reversing friction-wheel.

13. The combination with parallel shafts arranged in planes approximately at right angles with each other, of intermeshing gears driving two of said shafts oppositely from the others, a driving friction-wheel on the outer end of each shaft, two of the oppositely rotating friction-wheels having a low and two a high peripheral speed, a friction-shell partly inclosing all of said friction-wheels, a transmission-shaft secured axially therein, a bearing for said shaft adjacent the shell and means associated therewith adapted to afford an orbital movement for said shaft independent of its rotation and adapting the shell for engagement with any of the friction-wheels and means communicating the motion of the transmission-shaft to the mechanism to be driven.

14. A transmission device comprising rotatable shafts, friction-wheels on corresponding ends thereof, a friction-shell partly inclosing the same, a transmission-shaft axially engaged therein and means adjusting said friction-shell into engagement with any of the driving friction-wheels comprising a bearing for the transmission-shaft, an adjustably-slotted sleeve in which the bearing slides, a lever for rotating said sleeve and means adjusting the shaft in said slot, thereby affording an orbital adjustment of the shaft and shell.

15. In a device of the class described a positively-acting driving friction-wheel, a drum adapted to engage the same and be driven thereby, means adapted to adjust the drum into engagement with the driving friction-wheel comprising a rotatable bearing and a transversely-movable block therein, affording an orbital adjustment for the drum.

16. In a device of the class described, a driving friction element, a driven element, a transmission-shaft engaged thereon, a rotatable diametrically-slotted sleeve on said shaft, a sliding bearing-block in said sleeve, a lever adapted to rotate the sleeve, a lever adapted to move said shaft horizontally in the sleeve and mechanism adapted to vary the altitude of the shaft independently or simultaneously with the partial rotation of the sleeve.

17. The combination with a driven friction member and its transmission-shaft, of means adjusting the friction member and shaft comprising an adjustable bearing at one end of the shaft, orbitally-adjustable bearing near the other end of the same and adjacent the friction member and comprising a rotatable slotted sleeve, bearing-blocks slidable therein in which the shaft is journaled, a lever engaged thereon and acting to adjust the sleeve, a horizontally and a vertically acting shifting-lever for the bearing-block, all of said levers being capable jointly of affording an orbital adjustment of the shaft and friction member.

18. In a transmission device, driving friction members comprising high and low speed drive and high and low speed reverse wheels, a transmission-shaft, a friction-shell engaged thereon and partly inclosing said wheels and adapted to be adjusted into driving engagement with either of said wheels.

In testimony whereof I have hereunto subscribed my name in the presence of two subscribing witnesses.

GEORGE W. MARBLE.

Witnesses:
W. R. DONALDSON,
C. W. HILLS.